Feb. 14, 1956     D. I. CRITOPH ET AL     2,734,421
FILM PROJECTOR

Original Filed Oct. 23, 1948     3 Sheets-Sheet 1

INVENTORS
DAVID I. CRITOPH
FRED H. WOLFORD
JOHN F. HERRMANN
BY
ATTORNEYS

Feb. 14, 1956    D. I. CRITOPH ET AL    2,734,421
FILM PROJECTOR
Original Filed Oct. 23, 1948    3 Sheets-Sheet 2
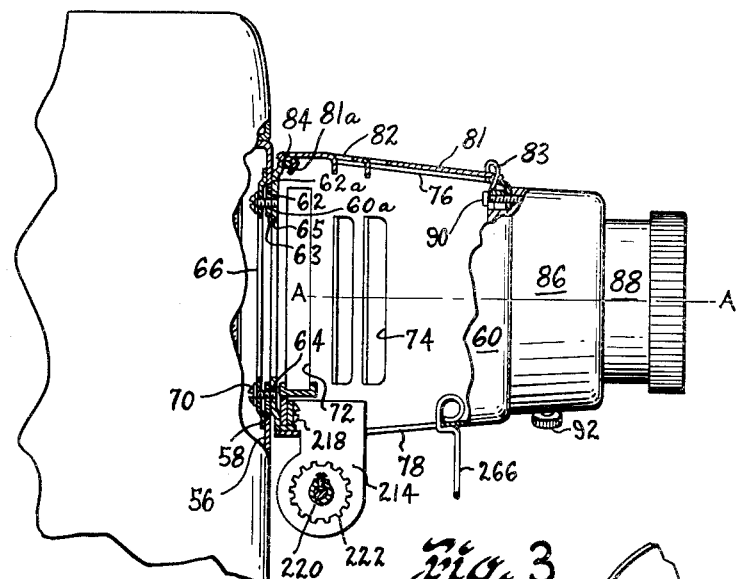
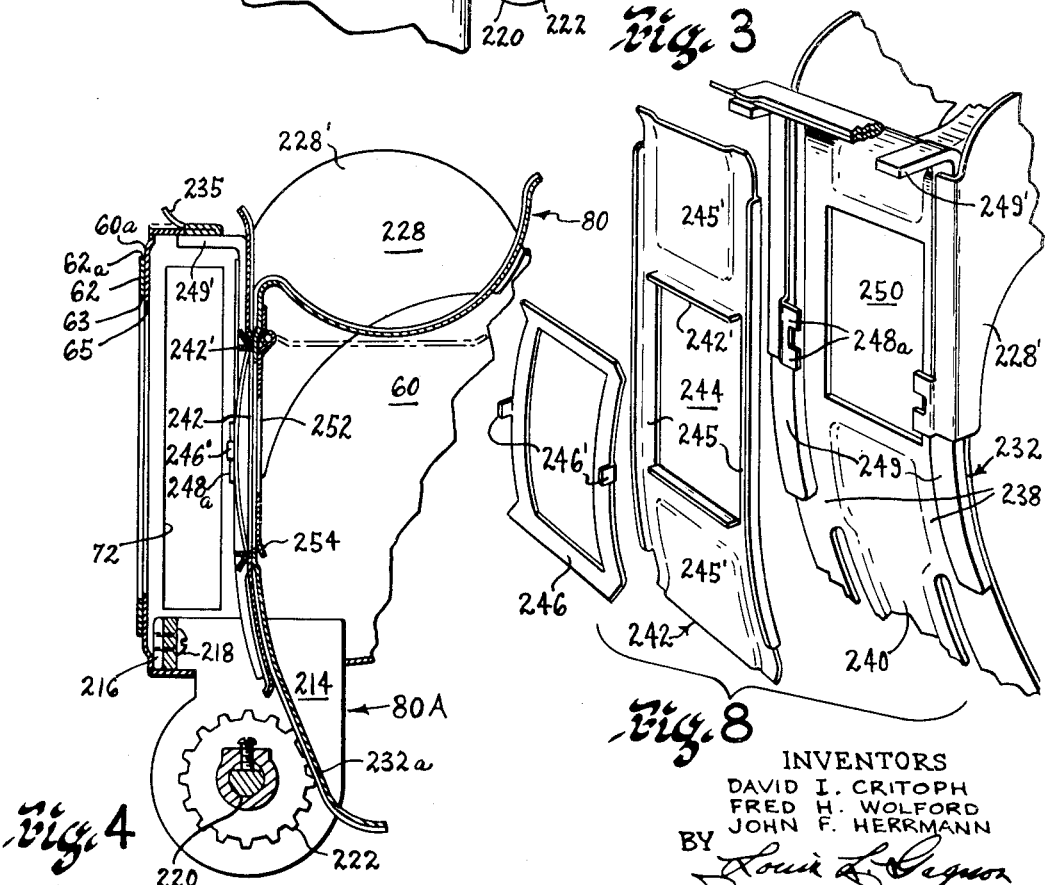
INVENTORS
DAVID I. CRITOPH
FRED H. WOLFORD
JOHN F. HERRMANN
ATTORNEYS Feb. 14, 1956 D. I. CRITOPH ET AL 2,734,421
FILM PROJECTOR
Original Filed Oct. 23, 1948 3 Sheets-Sheet 3
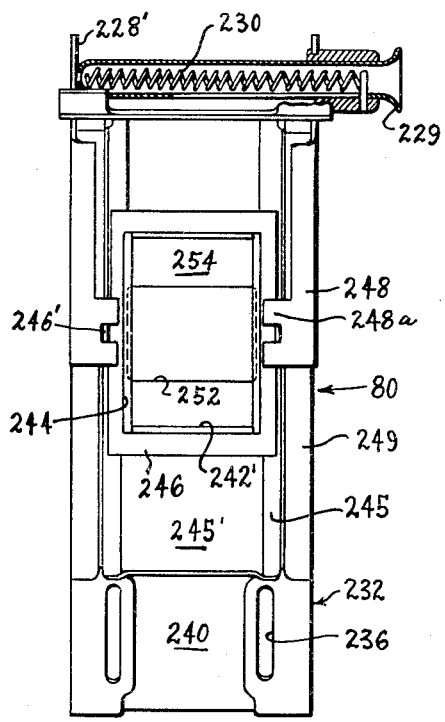
Fig. 6
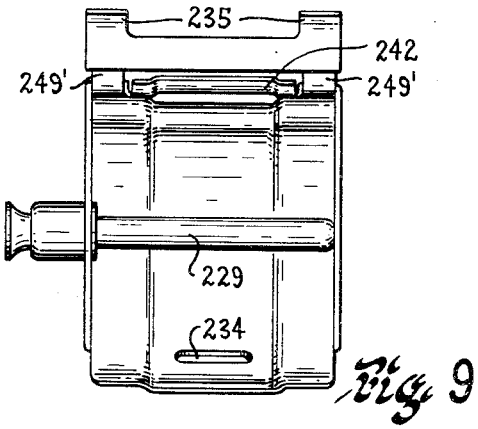
Fig. 9
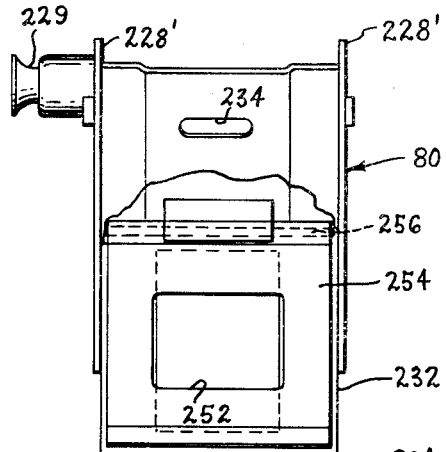
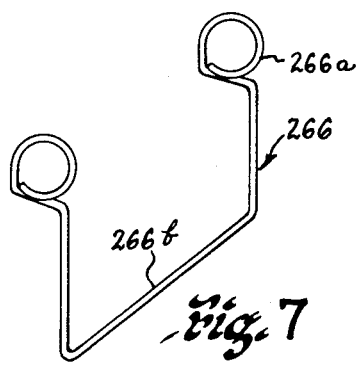
Fig. 7
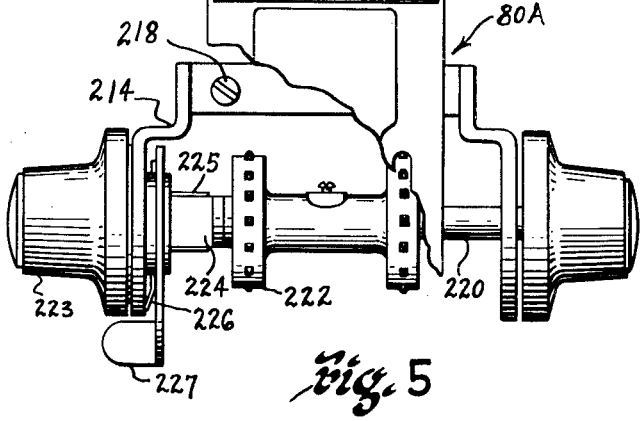
Fig. 5
INVENTORS
DAVID I. CRITOPH
FRED H. WOLFORD
JOHN F. HERRMANN
BY Louis L. Gagnon
Noble J. Williams
ATTORNEYS

United States Patent Office 2,734,421
Patented Feb. 14, 1956

2,734,421

FILM PROJECTOR

David I. Critoph, Snyder, and John F. Herrmann, Cheektowaga, N. Y., and Fred H. Wolford, Albuquerque, N. Mex., assignors to American Optical Company, Southbridge, Mass., a voluntary association of Massachusetts Original application October 23, 1948, Serial No. 56,222, now Patent No. 2,614,458, dated October 21, 1952. Divided and this application March 7, 1952, Serial No. 276,102

12 Claims. (Cl. 88—28)

This invention relates to projection apparatus for use with transparencies and is a division of copending application Serial Number 56,222 which was filed October 23, 1948, and which has since issued as Patent No. 2,614,458, dated October 21, 1952. More particularly the invention relates to certain details of construction for mounting, positioning and providing ready access to elements of the apparatus, for dissipating heat therefrom, and for framing the transparencies.

An object of the invention is to provide a projector of simple and sturdy construction and efficient performance.

Another object of the invention is to provide a projector embodying improved constructions for dissipating heat generated by a light source so that inner elements and external portions are maintained in a relatively cool condition.

A further object of the invention is to provide improved housing means having novel features of adjustability and permitting ready access to the interior of the projector.

Another object of the invention is to provide novel means for framing image areas of slide films of various dimensions.

These and other objects of the invention will be apparent from the following description taken in connection with the accompanying drawings, wherein like reference characters refer to like parts throughout the several views:

Fig. 3 is a partial side view of the projector, partly in section;

Fig. 4 is a partial sectional view of the projector and a removable mechanism for adapting the projector for slide film projection;

Fig. 5 is a rear view of certain of the elements shown in Fig. 4;

Fig. 6 is a front view, partly in section, of elements shown in Figs. 4 and 5;

Fig. 7 is a perspective view of strip film supporting means which may be employed with the projector of Fig. 1;

Fig. 8 is a partial exploded perspective view of the removable mechanism of Fig. 4; and, Fig. 9 is a top view of the removable mechanism.

Figure 1:
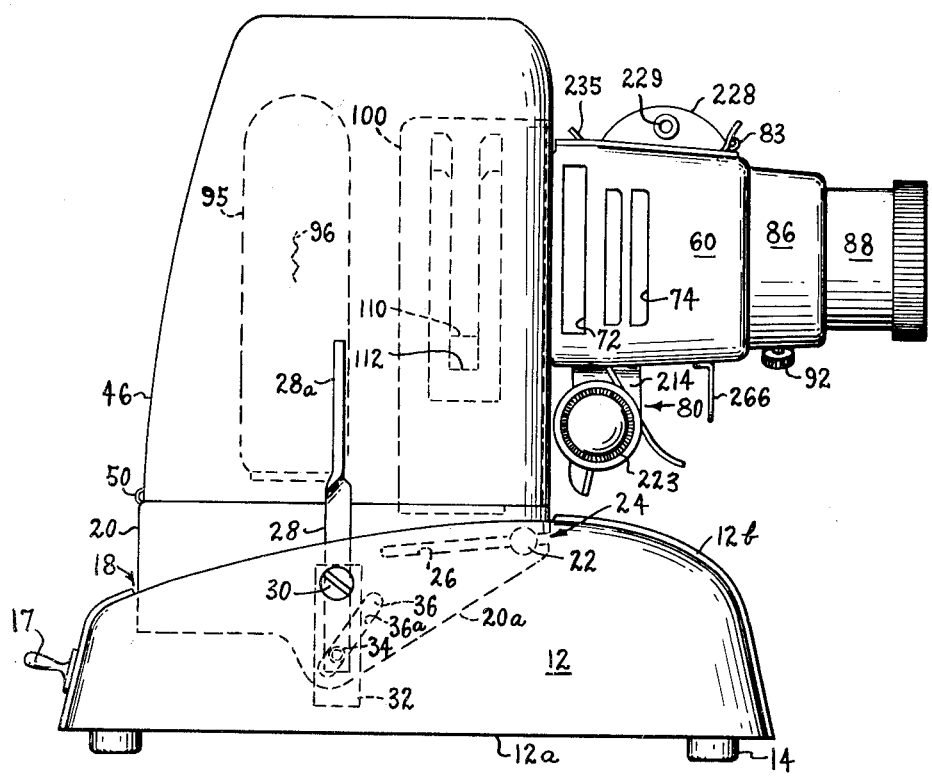
Figure 1 is a side view of a projector embodying the invention.

Referring to Fig. 1, an exterior side view of the slide and slide film projector is shown. The projector comprises a plurality of cooperating portions for housing and supporting its various components. Said portions include a base member 12 which forms a lower chamber within its walls, said member 12 comprising a lower wall 12a having a plurality of supporting feet 14, formed of rubber or the like attached thereto. A plurality of apertures (not shown) are formed in lower wall 12a providing means for intake of air to said chamber wherein a motor-driven fan is located. Toggle switch 17 is employed in motor and lamp circuits of the projector. A relatively large aperture 18 is formed in an upper wall 12b of base 12 for receiving a supporting member 20. Supporting member 20 is pivotally mounted upon base 12 as, for example, by a pair of bosses or protuberances 22. Said bosses are formed to extend inwardly from the sides of base 12 and have their inner ends positioned between pairs of indentations 24 formed in frontal side wall portions 20a of supporting member 20 so that these side wall portions may pivot thereon. Side wall portions 20a extend downwardly and terminate within the base member in the form of an opening leading into the chamber of the latter. A split construction of wall portions 20a is provided by a pair of slots 26 (one slot only being shown), extending rearwardly appreciably from the front edges of portions 20a and from indentations 24. Said construction permits the lower parts of side wall portions 20a to be sprung together for disengaging the lower parts of the side walls 20a from bosses 22 so that supporting member 20 may be separated from base 12. Removal of member 20 permits ready access to chamber means of base 12 through aperture 18.

Supporting member 20 is capable of being tilted about said pivotal means 22—24. Means for the purpose comprise a lever 28 having a pivot 30 preferably rigidly fastened thereto, the latter being rotatably mounted upon a fixed supporting means such as bracket 32. Said bracket may appropriately be rigidly attached, as by welding, to a side wall of base 12. Upper portions of supporting member 20 provide means for supporting other elements of the projector. A pin 34, preferably fixedly mounted on a lower portion of lever 28, is slidably positioned in an angular cam slot 36 formed in one of said side wall portions 20a, as shown in Fig. 1, and extending from its lower extremity upwardly and forwardly at a predetermined angle. The difference in radial distance of each of pivots 30 and 22—24 relative to pin 34, taken in conjunction with said movement of pin 34 in slot 36, enables a relatively small rotation of supporting member 20 in response to a relatively large rotation of lever handle 28a. As shown, the extremities of slot 36 define the limits of rotation of supporting member 20, although it will be apparent that other limit stop means could readily be provided for the purpose.

An upper housing 46 comprises preferably unitary side, rear and partial frontal wall portions, an open bottom, and an aperture 48 formed in its upper extremities, said aperture having light-shielded louvers 49 mounted therewithin. Housing 46 serves to substantially enclose elements of the apparatus and is pivotally mounted upon supporting member 20 by hinge means 50. Suitable latching means, such as latch 52 is provided for holding housing 46 at closed position. When housing 46 is pivoted about hinge 50 to its open position, access may be had to elements normally enclosed thereby.

A plate member 56, having a circular aperture 58 formed therein, is rigidly attached to frontal portions of supporting member 20. A frontal or auxiliary housing 60 is rotatably mounted upon plate member 56, mounting means therefor comprising a circular plate 62 rigidly attached, as by welding, to a rear wall portion 60a of auxiliary housing 60. Plate 62 has a projection aperture 63 and a plurality of threaded perforations 64 (Fig. 3) formed therein. Rear wall portion 60a has a projection aperture 65 formed therein. Peripheral portions 62a of said plate are adapted to be slidably inserted in aperture 58 of plate member 56. An annular spring-like washer 66, of larger outside diameter and smaller inside diameter than circular aperture 58 of plate member 56, is mounted upon plate 62 by a plurality of screws 70 engaging threaded perforations 64. When screws 70 are tightened, bias is applied by washer 66 to said screws sufficient to draw housing portions 60a in positive but rotatable contact with plate 56. Housing 60 may thereby be readily rotated with respect to plate member 56, rear wall portion 60a preferably being formed to extend slightly beyond other rear wall portions of housing 60 to provide a reduced bearing surface for the purpose.

Figure 2:
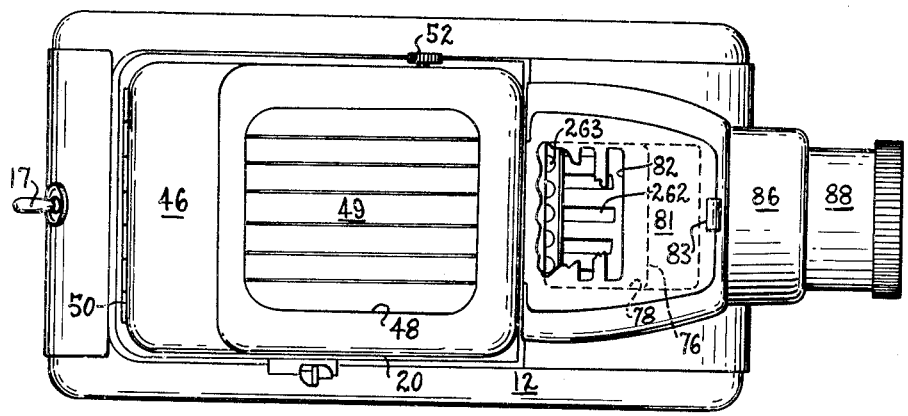
Fig. 2 is a plan view of the projector, certain parts thereof being broken away to show details thereof.

Frontal housing 60 has a plurality of apertures formed in side, upper and lower portions thereof as shown in Figs. 1, 2, and 3. Slot-like apertures 72 (Figs. 1 and 3) are adapted to have a slide carrier inserted therein. Light-shielded apertures or louvers 74 serve as ventilating means for said housing. Apertures 76 and 78 are adapted to have mechanism 80 for supplying and advancing a slide film, mounted therein. Aperture 78 also serves to admit cool air to housing 60, as will presently be described. As shown a cover plate 81, having light-shielded apertures 82 formed therein, provides a closure for aperture 76 when slide film mechanism 80 is removed from housing 60, cover plate 81 being releasably held at operative position by a clip 83 and one or more ears 84 (Fig. 3) engaging suitably formed extremities 81a of said cover plate. A lens barrel adapter 86, formed for reception of a lens barrel 88 is releasably attached to frontal housing 60 by retaining screw means 90 (Fig. 3). Said adapter has a suitable bore formed therein and a set screw 92 adapted to extend into said bore for releasably holding lens barrel 88, it being assumed that a suitable objective (not shown) is mounted within said lens barrel. Adapter 86 is preferably formed to receive any of a plurality of interchangeable lens barrels which mount objective lenses of various focal length for use with slides of different types.

Referring to Fig. 3, line "A—A" represents an optical axis extending from lamp 95 and its filament 96 through optical elements of the projector. A forward prolongation of said optical axis as, for example, an extension thereof to a projection screen, may be elevated or lowered with respect to said screen through previously described tilting mechanism of the projector. Thus, when lever handle 28a of the tilting mechanism, as viewed in Fig. 1, is manually rotated in a counterclockwise direction, pin 34 is caused to travel along slot 36, while providing a bias against slot surface 36a, and to cause pivotal movement of supporting member 20 in a counterclockwise direction around pivotal means 22—24. Accordingly, upper housing 46, frontal housing 60, adapter 86 and lens barrel 88, and elements mounted therewithin, will simultaneously undergo arcuate or bodily movement in a similar direction and said extension of optical axis "A" will be elevated with respect to the projection screen. A clockwise rotation of lever handle 28a will produce a reversal of the aforesaid movements.

The means for mounting the condenser lens carriage 100, and for mounting said carriage in track means 110 and 112 comprise a plurality of contacting surfaces so relatively positioned as to insure that the optical axis of the condenser lens system extends centrally, respectively, through aperture 58 of plate member 56, aperture 63 of housing 60, the aperture of adapter 86 and lens barrel 88 and through objective lens elements which, although not shown, are understood to be mounted in the latter.

A preferred embodiment of the projector is adapted to use both slides and slide film interchangeably. Mechanism 80 for handling slide or strip film is releasably mounted in housing 60 as shown in Figs. 1 and 4. In Figs. 2 and 3, the projector is shown with mechanism 80 removed, aperture 72 being adapted for the introduction of a suitable slide carrier, it being understood that guide and framing means (not shown), for said slide carrier are mounted within housing 60 between said apertures 72. As shown in Fig. 4, individual mounting means 72 and 232 are provided for positioning a slide and slide-film, respectively, in separate planes for projection. Said mounting means are placed in spaced relation along the optical axis and permit alternate projection of a slide and slide film as well as continuous projection of one or the other form of transparency.

The slide film advancing mechanism 80A (Figs. 1, 3 and 4) comprises a supporting bracket 214 which is detachably mounted upon a supporting member 216, carried by frontal housing 60, by screw means 218 (one screw and member not shown), said screw means being accessible through aperture 78. Bracket 214 serves to rotatably mount a shaft 220 which bears sprocket means 222 adapted to engage film such as 35 mm. slide or strip film, and a pair of actuating knobs 223 positioned at each extremity of the shaft, for rotating said sprocket means. Suitable rotatable detent means 224 (Fig. 5) mounted upon shaft 220 and engaging fixed spring-like detent means 225 are provided for positioning frames of film at the projection aperture. Frictional framing means 226 for rotating said knobs, sprocket and detent means together, as a unit, to initially position the film are also provided, said framing means being actuated by lever 227.

Means associated with the film advancing mechanism 80A for supplying the slide film comprises an open magazine 228 having a spring-actuated plunger 229 mounted upon a wall thereof. Said plunger may be drawn outwardly from magazine 228, against the bias of spring 230. A roll of slide or strip film may then be placed in the magazine, and the plunger allowed to return to its normal position through the open center of the film roll, thus releasably holding the film in the magazine.

Magazine 228, as shown in Figs. 4, 5 and 6, is formed substantially unitary with side plates 228' and composite plate means 232, the latter including or having associated therewith components for guiding the film to projection apertures, presently to be described, for framing the film with respect to said apertures, and for guiding the film to said sprocket means 222. When cover plate 81 (Fig. 3) has been removed, said unitary magazine and plate means may be inserted in frontal housing 60, clip 83 then engaging a slot 234 formed adjacent an extremity of the magazine, an extending portion 235 on plate means 232 engaging portion 84 of the frontal housing and an extremity 232a of the plate means bearing against peripheral portions of sprocket 222. A pair of slots 236 formed in the extremity of the plate means permits unrestricted passage of the sprocket teeth therethrough.

As shown in Figs. 6 and 8, plate 232 comprises channeled or track means 238 for bearing marginal portions of the film and a recessed central area 240 for avoiding frictional contact with image areas of the film. A pressure plate 242 having an aperture 244 formed therein is provided with a pair of elongated side rails 245 outwardly of the aperture 244. These side rails are arranged to normally overlie the spaced track means 238 and to hold recessed central portions 245' of the pressure plate out of contact with image areas of the film. A spring member 246 is arranged to press the side rails 245 toward the track means 238. Thus the track means and the side rails may yieldably engage opposite sides of strip film along the marginal edges thereof and together maintain image areas of the film in proper position for projection. Rearwardly bent flanges 242' are provided on pressure plate 242 adjacent the top and bottom edges of aperture 244. The spring member mentioned above is in the form of an open rectangular frame which fits around aperture 244 and confines flanges 242' between its upper and lower edges. Opposite side portions of this open frame 246 are inherently slightly arched and are provided with bosses 246'.

The side plates 228' forming the magazine 228 for receiving coiled film are secured to the plate 232 adjacent the front edge thereof and each side plate extends rearwardly and downwardly and is bent inwardly at its rear edge to form vertical flanges 248 each having a pair of bifurcated arms 248a thereon and spaced so as to receive one of the bosses 246' therebetween. A pair of rigid spacing bars 249 are rigidly secured to the vertical flanges 248 and to the vertical central apertured portion of plate 232. The upper free ends of these bars are bent rearwardly, as indicated at 249' and serve as supporting means for the extending portion 235 mentioned above. The lower ends of spacing bars 249 below the side plates 248 are rigidly secured to the plate 232 to strengthen extension 232a.

Thus it will be seen that the spring member 246 yieldably urges the pressure plate 242 toward plate 232 when these parts are assembled for use. At times it may be desirable to clean these parts and at such times they may be readily separated by first pressing the bosses 246' inwardly so as to disengage from the bifurcated arms 248a, after which the pressure plate 242 and the spring member 246 may be slid downwardly together and out of engagement with the remainder of the film supporting mechanism 80. Pressure plate 242 serves to bias the film in contact with guide plate means 232 adjacent a projection aperture 250 which is formed in plate 232. The focal plane of an objective lens is to be established at said aperture. Means forming a third aperture 252, presently to be described, is visible in Fig. 6, looking through aperture 250. Aperture 252 is dimensioned according to the dimensions of a single frame of film, while aperture 250 is of the size of double frames of film, said apertures being selectively adapted to accommodate either type of film. In Fig. 5, which illustrates both a surface of guide plate means 232 opposite to that shown in Fig. 6 and the film advancing means, a framing plate 254 having said projection aperture 252 formed therein, is shown as pivotally mounted upon guide plate means 232 by a hinge 256 comprising a frictional bearing which serves to hold plate 254 at any position to which it is pivoted. When plate 254 is positioned as shown, it serves to frame a single frame of film. When plate 254 is pivoted upwardly as shown by dotted lines in Fig. 4, out of the range of the projection beam, aperture 250, which, as above stated, is formed in guide plate means 232 serves to frame an area of the film equal to two single frames thereof. Either of said framing apertures may be employed at will according to the requirements of the film. Where the images are printed sideways of the film, housing 60 may be rotated, as previously described, to properly position the projected images on the screen.

The aforesaid constructions as shown and described permit a maximum of air circulation to all surfaces of the elements. A blower fan (not shown) is mounted within the chamber of base 12 and provides a forced flow of cool air to said surfaces. Air is drawn into said chamber through the bottom and is expelled upwardly through aperture 18 and through a plurality of apertures 262 (Figs. 1 and 2) formed in an upper frontal wall 12b of base 12. A plurality of apertures 263 are provided in the slide supporting frame for cooling a slide when mounted in apertures 72. The portion of cool air which is expelled through aperture 18 of base member 12 passes through supporting member 20 and through the housing 46 is expelled between light-shielded louvers 49 and through aperture 48 at the top of the projector. The tapered upper contour of housing 46 adjacent aperture 48 thereof, contributes to said expulsion of air in the form of a relatively narrow column which results in an upward flow of air adjacent outer wall surface of housing 46 and thus facilitates cooling of said surfaces. The portion of cool air which is expelled through apertures 262 of base member 12 flows upwardly, substantially in the form of a column, and enters aperture 78 of auxiliary or frontal housing 60 wherein it is introduced to surfaces of either a slide or a slide film, according to which form of transparency may be mounted therein for projection. Air is released from housing 60 through light-shielded apertures 74 and 82 and between portions of slide aperture 72 and aperture 76, according to the type of transparency being projected. The above-described air-circulating system comprising said fan and plurality of air intake and outlet apertures enables maintenance of enclosed elements at relatively low temperatures during operation of the projector and also prevents external housing surfaces from becoming noticeably heated.

Take-up means 266 is provided for receiving the slide film after its projection and for maintaining said film in a coiled condition ready for rewinding. Said take-up means may preferably be of a U shape and have a transverse portion 266b adapted to have the film coiled therearound and other portions adapted to be releasably attached to housing 60 such as a pair of clip-like members 266a. When a strip of slide film is advanced from sprocket 222 it has an inherent tendency to coil upon itself. Take-up portion 266b is positioned so that a coil of slide film will be formed thereabout after leaving sprockets 222. As the bulk and weight of the film increases it is supported by member 266b. When all of the film has passed to the take-up means, the trailing edge thereof may be drawn from the coil and the film may be rewound upon itself for placing the same in suitable condition for further projection.

It will be apparent that certain changes in the constructions set forth could be made without departing from the spirit of the invention and, therefore, it is intended that all matter contained in the above description or shown in the accompanying drawings shall be interpreted as illustrative and not in a limiting sense.

What is claimed is:

1. In a film projector, the combination of a main housing having a projection aperture therein, a hollow auxiliary housing carried by said main housing and surrounding said projection aperture, said auxiliary housing having means supporting a projection objective in spaced relation to said aperture and in substantial alignment therewith, a pair of opposed openings in opposite side wall portions of said auxiliary housing, a strip film supporting device carried by said auxiliary housing, said supporting device comprising a hollow magazine portion and a strip film guiding portion having a projection opening therein, said film guiding portion communicating with said magazine portion so as to receive strip film therefrom, said supporting device fitting within said opposed openings in said auxiliary housing so as to position strip film at said projection opening in alignment with the projection aperture in said main housing for projection purposes, said magazine portion being exposed adjacent one side wall of said auxiliary housing so as to receive coiled strip film, and said strip film guiding portion extending outwardly through the opening in the opposite side wall of said auxiliary housing so as to direct film outwardly thereof.

2. In a film projector, the combination of a main housing having a projection aperture therein, a hollow auxiliary housing carried by said main housing and surrounding said projection aperture, said auxiliary housing having means supporting a projection objective in spaced relation to said aperture and in substantial alignment therewith, a pair of opposed openings in opposite side wall portions of said auxiliary housing, a strip film supporting device carried by said auxiliary housing, said supporting device comprising a hollow magazine portion and a strip film guiding portion having a projection opening therein, said film guiding portion communicating wtih said magazine portion so as to receive strip film therefrom, said supporting device fitting within said opposed openings in said auxiliary housing when in operative position in said projector so as to position strip film at said projection opening in alignment with the projection aperture in said main housing for projection purposes, said magazine portion being exposed adjacent one side wall of said auxiliary housing so as to receive coiled strip film, and said strip film guiding portion extending outwardly through the opening in the opposite side wall of said auxiliary housing so as to direct film outwardly thereof, said supporting device being readily removable from said auxiliary housing when said projector is to be used for other projection purposes, and means between said supporting device and auxiliary housing for detachably retaining said supporting device in said operative position in the auxiliary housing.

3. In a film projector, the combination of a main housing having a projection aperture therein, a hollow auxiliary housing carried by said main housing and surrounding said projection aperture, said auxiliary housing having means supporting a projection objective in spaced relation to said aperture and in substantial alignment therewith, a pair of opposed openings in opposite side wall portions of said auxiliary housing, a strip film supporting device carried by said auxiliary housing, said supporting device comprising a hollow magazine portion and a strip film guiding portion having a projection opening therein, said film guiding portion communicating with said magazine portion so as to receive strip film therefrom, said supporting device fitting within said opposed openings in said auxiliary housing when in operative position in said projector so as to position strip film at said projection opening in alignment with the projection aperture in said main housing for projection purposes, said magazine portion being exposed adjacent one side wall of said auxiliary housing so as to receive coiled strip film, and said strip film guiding portion extending outwardly through the opening in the opposite side wall of said auxiliary housing so as to direct film outwardly thereof, said supporting device being readily removable from said auxiliary housing when said projector is to be used for other projection purposes, a readily operable strip film advance mechanism carried by said auxiliary housing adjacent one of the openings in said side walls and having film moving means thereon engageable with strip film so as to advance said film relative to the projection opening in said film guiding portion, and means between said supporting device and auxiliary housing for detachably retaining said supporting device in said operative position in the auxiliary housing.

4. In a film projector, the combination of a main housing having a light aperture therein, a hollow auxiliary housing carried by said main housing and surrounding said light aperture, said auxiliary housing having means supporting a projection objective in spaced relation to said light aperture and in substantial alignment therewith, a pair of opposed openings in opposite side wall portions of said auxiliary housing, a strip film supporting device carried by said auxiliary housing, said supporting device comprising a magazine portion for receiving a coil of strip film and a plate-like film guiding portion extending downwardly therefrom and having a projection aperture therein, said film guiding portion having spaced film guiding surfaces communicating with said magazine portion so as to receive and guide opposite edges of strip film extending therefrom, a movable apertured pressure plate having side rails at opposite sides thereof, resilient means arranged to yieldably urge said side rails toward said film guiding surfaces for maintaining strip film when positioned therebetween in substantial transverse alignment with said side rails, said supporting device fitting within said opposed openings in said auxiliary housing so as to position said projection aperture adjacent the light opening in said main housing for projection purposes, said magazine portion being exposed adjacent one side wall of said auxiliary housing for receiving coiled strip film, and said strip film guiding portion extending through said auxiliary housing and outwardly through the opening in the opposite side wall of said auxiliary housing so as to direct used strip film outwardly thereof.

5. In a film projector, the combination of a main housing having a light aperture therein, a hollow auxiliary housing carried by said main housing and surrounding said light aperture, said auxiliary housing having means supporting a projection objective in spaced relation to said light aperture and in substantial alignment therewith, a pair of opposed openings in opposite side wall portions of said auxiliary housing, a strip film supporting device carried by said auxiliary housing, said supporting device comprising a magazine portion for receiving a coil of strip film and a plate-like film guiding portion extending downwardly therefrom and having a projection aperture therein, said film guiding portion having spaced film guiding surfaces communicating with said magazine portion so as to receive and guide opposite edges of strip film extending therefrom, a movable apertured pressure plate having side rails at opposite sides thereof, resilient means arranged to yieldably urge said side rails toward said film guiding surface for maintaining strip film when positioned therebetween in substantial transverse alignment with said side rails, said supporting device fitting within said opposed openings in said auxiliary housing so as to position said projection aperture adjacent the light opening in said main housing for projection purposes, said magazine portion being exposed adjacent one side wall of said auxiliary housing for receiving coiled strip film, and said strip film guiding portion extending through said auxiliary housing and outwardly through the opening in the opposite side wall of said auxiliary housing so as to direct strip film outwardly thereof, said supporting device being readily removable from said auxiliary housing when said projector is to be used for other projection purposes, and means between said device and auxiliary housing for detachably retaining said supporting device in said operative position in the auxiliary housing.

6. In a film projector, the combination of a main housing having a light aperture therein, a hollow auxiliary housing carried by said main housing and surrounding said light aperture, said auxiliary housing having means supporting a projection objective in spaced relation to said light aperture and in substantial alignment therewith, a pair of opposed openings in opposite side wall portions of said auxiliary housing, a strip film supporting device carried by said auxiliary housing, said supporting device comprising a magazine portion for receiving a coil of strip film and a plate-like film guiding portion extending downwardly therefrom and having a projection aperture therein, said film guiding portion having spaced film guiding surfaces communicating with said magazine portion so as to receive and guide opposite edges of strip film extending therefrom, a movable apertured pressure plate having side rails at opposite sides thereof, resilient means arranged to yieldably urge said side rails toward said film guiding surface for maintaining strip film when positioned therebetween in substantial transverse alignment with said side rails, said resilient means engaging a part of said supporting device while holding said pressure plate in operative position in said device, and said resilient means being readily disengageable from said supporting device when said device is removed from said auxiliary housing and thereby allowing said pressure plate to be removed from said device for cleaning purposes or the like.

7. In a projector adapted to use slide film, a housing, a light source within said housing, objective lens system supported by said housing and providing an optical axis aligned with said light source, means forming a light opening within said housing in a position to have said optical axis extend substantially centrally therethrough, a readily removable slide film magazine adapted to be supported by said housing and having plate-like guide means extending therefrom so as to be disposed across said light opening when positioned in said housing, means forming a projection aperture in said plate-like guide means adjacent said light opening of suitable dimensions for framing predetermined double size frames on said slide film, said plate-like guide means having elongated side rail portions guiding and confining opposite side edge portions of said slide film in a predetermined focal plane while disposed adjacent said double size projection aperture, a plate member having a projection aperture formed therein of suitable dimensions for framing a single size frame on said film, and hinge means interconnecting said plate member and said guide means for pivotal movement about an axis located adjacent a side of said double size aperture for selectively locating said plate member in an inoperative position to one side of said optical axis or in an operative position adjacent said plate-like guide means with said single size aperture therein overlying said double size aperture, whereby double size frames and single size frames on said slide film may be accommodated and framed in said projector.

8. In a projector adapted to use slide film, a housing, a pair of transversely aligned openings in wall portions of said housing, a light source within said housing, objective lens system supported by said housing and providing an optical axis aligned with said light source, means forming a light opening within said housing in a position to have said optical axis extend substantially centrally therethrough, a readily removable slide film magazine having integral plate-like guide means extending therefrom, said slide film magazine and guide means being insertable into said housing so as to be disposed in said pair of aligned openings and adapted to be disposed across said light opening when operatively positioned in said housing, means forming a projection aperture in said plate-like guide means adjacent said light opening for framing frames on said slide film, said plate-like guide means having elongated side rail portions, an apertured movable pressure plate having elongated side rail portions thereon, said first and second side rail portions serving to guide and confine opposite side edge portions of said slide film in a predetermined focal plane while disposed adjacent said projection aperture, spring means for urging said pressure plate toward said plate-like guide means, and connecting means associated with said plate-like guide means and with said pressure plate for yieldably maintaining the apertures therein in alignment, said connecting means allowing said pressure plate to be readily removable from said plate-like guide means for cleaning purposes and the like when said magazine is removed from said projector.

9. In a projector adapted to use slide film, a housing, a pair of transversely aligned openings in wall portions of said housing, a light source within said housing, objective lens system supported by said housing and providing an optical axis aligned with said light source, means forming a light opening within said housing in a position to have said optical axis extend substantially centrally therethrough, slide film magazine having integral plate-like guide means extending therefrom, said slide film magazine and guide means being disposed in said housing within said pair of aligned openings and across said light opening when operatively positioned in said housing, means forming a projection aperture in said plate-like guide means adjacent said light opening for framing frames on said slide film, said plate-like guide means having elongated side rail portions guiding and confining opposite side edge portions of said slide film in a predetermined focal plane while disposed adjacent said projection aperture, sprocket means rotatably carried by means attached to said housing for advancing said slide film relative to said projection aperture, said sprocket means having teeth for engaging series of openings in said slide film, a pair of recesses in the end of said plate-like guide means remote from said magazine for receiving the free ends of said sprocket teeth while projecting through the opening in said slide film extending across said projection aperture, said magazine and guide means being readily removable from said housing and sprocket means, and releasable catch means between said housing and said magazine for retaining said magazine and guide means in operative position in said projector.

10. In a projector adapted to use slide film, a housing, a light source within said housing, objective lens system supported by said housing and providing an optical axis aligned with said light source, means forming a light opening within said housing in a position to have said optical axis extend substantially centrally therethrough, a readily removable slide film magazine adapted to be supported by said housing and having integral plate-like guide means extending therefrom so as to be disposed across said light opening when positioned in said housing, means forming a projection aperture in said plate-like guide means adjacent said light opening of suitable dimensions for framing predetermined double size frames on said slide film, said plate-like guide means having elongated side rail portions guiding and confining opposite side edge portions of said slide film in a predetermined focal plane while disposed adjacent said double size projection aperture, a plate member having a projection aperture formed therein of suitable dimensions for framing a single size frame on said film, hinge means interconnecting said plate member and said guide means for pivotal movement about an axis located adjacent a side of said double size aperture for selectively locating said plate member in an inoperative positio nto one side of said optical axis or in an operative position adjacent said plate-like guide means with said single size aperture therein overlying said double size aperture, whereby double size frames and single size frames on said slide film may be readily framed in said projector, and complementary latch means carried by said magazine and guide means and adjacent portion of said housing for releasably retaining said magazine in place in said projector and permitting removal thereof for ready access to change the position of said plate member.

11. In a strip film projector the combination of a housing having a light aperture therein, a light source in said housing, an objective supported in operative relation to said housing and having a projection axis extending through said light aperture and aligned with said light source, a film magazine carried by said projector and positioned so as to support a coil of strip film at one side of said projection axis, transversely disposed film guiding means arranged to support a portion of said strip film extending from said film magazine in a predetermined focal plane aligned with said objective, means defining a projection aperture substantially at said focal plane, a strip film advance mechanism carried by said projector for engaging and moving the strip film extending from said film magazine across said projection aperture, additional film guiding means extending outwardly from the side of said projector opposite said film magazine for guiding said strip film after being projected at said projection aperture, said additional guiding means having an extremity curving forwardly so as to direct the leading free end of the strip film as it leaves said last mentioned guiding means in a forward and upward direction, so that said strip film will tend to naturally coil upon itself, and a film coiling device removably carried by said projector and being in the form of a single bar-like element having a transversely disposed bar-like central film supporting portion connected to a pair of upstanding side arm portions which terminate at their upper ends in resilient loop-like portions adapted to resiliently and removably grip parts of said projector at spaced locations, whereby said transverse bar-like portion will be positioned in such spaced relation to said upwardly curving extremity and in such spaced relation to other adjacent parts of said projector as to automatically receive and coil the free end portion of said strip film thereabout as it leaves said additional film guiding means while said strip film is being propelled forwardly through said projector by said film advance mechanism.

12. The combination set forth in claim 2 and including a film coiling device carried by said projector and having a single transversely disposed bar-like portion positioned forwardly and in such spaced relation to said strip film guiding portion extending outwardly through the opening in the opposite side wall of said auxiliary housing as to receive and support the free end of the film, so as to automatically coil said film thereabout while said film is being advanced through said projector by said film advance mechanism.

References Cited in the file of this patent

UNITED STATES PATENTS

| | | |
|---|---|---|
| 1,704,814 | Wellman | Mar. 12, 1929 |
| 1,981,275 | Martin | Nov. 20, 1934 |
| 2,126,474 | Kleerup | Aug. 9, 1938 |
| 2,169,010 | Teague et al. | Aug. 8, 1939 |
| 2,172,256 | Nagel | Sept. 5, 1939 |
| 2,174,660 | Hirsch | Oct. 3, 1939 |
| 2,231,743 | Young et al. | Feb. 11, 1941 |
| 2,243,160 | Koehl | May 27, 1941 |
| 2,251,077 | Stanton | July 29, 1941 |
| 2,457,914 | Nemeth | Jan. 4, 1949 |
| 2,553,075 | Bradford | May 15, 1951 |
| 2,614,458 | Cristoph et al. | Oct. 21, 1952 |

FOREIGN PATENTS

| | | |
|---|---|---|
| 883,522 | France | Mar. 29, 1943 |
| 563,669 | Great Britain | Aug. 24, 1944 |